April 7, 1970 W. E. REIMER 3,504,928
SUSPENSION SYSTEM FOR VEHICLES
Filed Aug. 26, 1968 3 Sheets-Sheet 1
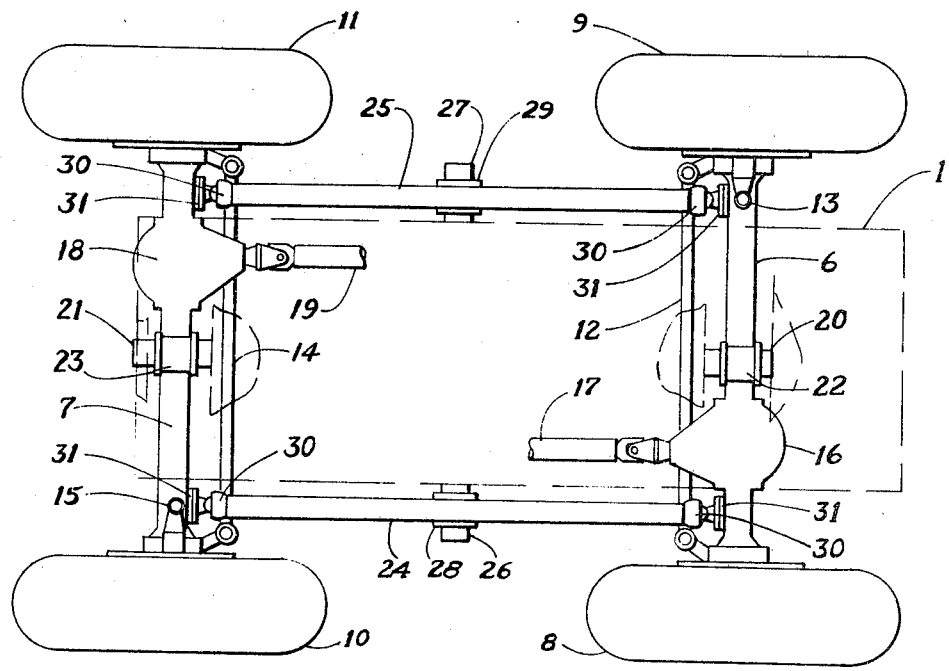
Fig. 1
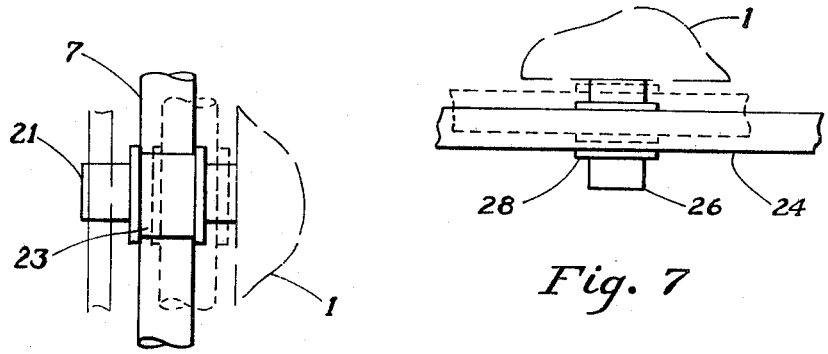
Fig. 6
Fig. 7
INVENTOR.
Walter E. Reimer
BY Webster & Webster
ATTYS.

April 7, 1970  W. E. REIMER  3,504,928

SUSPENSION SYSTEM FOR VEHICLES

Filed Aug. 26, 1968  3 Sheets-Sheet 2

April 7, 1970  W. E. REIMER  3,504,928
SUSPENSION SYSTEM FOR VEHICLES
Filed Aug. 26, 1968  3 Sheets-Sheet 3

United States Patent Office 3,504,928
Patented Apr. 7, 1970

3,504,928
SUSPENSION SYSTEM FOR VEHICLES
Walter E. Reimer, 16201 Ridgecrest Drive,
Monte Sereno, Calif. 95030
Filed Aug. 26, 1968, Ser. No. 755,227
Int. Cl. B60g 9/02
U.S. Cl. 280—104
5 Claims

ABSTRACT OF THE DISCLOSURE

A suspension system, for a four-wheel vehicle having a frame and transversely extending front and rear wheel-supporting axles, comprising longitudinal trunnions mounted on the frame adjacent the ends and centrally of its sides, each axle being mounted at its mid-point on the corresponding longitudinal trunnion for rocking in a substantially vertical transverse plane and simultaneous sliding in a direction axially of said corresponding longitudinal trunnion, transverse trunnions projecting from the sides of the frame centrally of its ends, a longitudinal rocking beam extending along each side of the frame, each beam being mounted at its mid-point on the corresponding transverse trunnion for rocking in a substantially vertical longitudinal plane and simultaneous sliding in a direction axially of said corresponding transverse trunnion, and individual ball and socket units connected between the ends of the rocking beams and the related axles.

BACKGROUND OF THE INVENTION

The present invention represents a modification of the suspension system shown in my U.S. Patent No. 3,313,555, patented Apr. 11, 1967; the structural assembly of the present modification having been developed in the course of seeking greater ease and economy of manufacture and more efficient operation with reduced maintenance requirements.

SUMMARY OF THE INVENTION

The present invention provides, as a major object, a novel and improved suspension system especially adapted—but not limited—for embodiment in a four-wheel tractor-type vehicle such as those intended for relatively heavy-duty use in industrial, commercial, and earth working activities; the suspension system also being suitable for vehicles of "on and off" the road type, and of which the well-known "Jeep," pick-up trucks, or the like, are examples.

The present invention provides, as another object, a suspension system for a four-wheel vehicle, as in the preceding paragraph, which in use compensates—free of twist or strain—for upward or downward motion of any individual wheel in a manner such that the other wheels in relative responsive motion substantially lessen (compared to conventional suspension systems) the attendant lateral tilting of the vehicle as a whole while effectively stabilizing the same.

The present invention provides, as still another object, a vehicle suspension system, as above, wherein the compensating action of such system assures that the four wheels of the vehicle remain at all times in ground engagement and with the weight or load substantially equally distributed on the wheels even though the vehicle be traversing uneven terrain, and which it can do with ease in comparison to vehicles with conventional suspension ssytems.

The present invention provides, as an additional object, a vehicle suspension system which is of particular advantage, when embodied in a four-wheel drive vehicle, in that traction at all four wheels is always positive; this for the reason that all the wheels under substantially the same loading remain in driving engagement with the ground even though uneven terrain is being traversed, with one or more wheels oscillating up and down.

The present invention provides, as a further object, a vehicle suspension system functionally characterized, as in the preceding paragraph, which comprises—in combination with the vehicle frame and transversely extending front and rear wheel-supporting axles—longitudinal trunnions mounted on the frame adjacent the ends and centrally of its sides, each axle being mounted at its mid-point on the corresponding longitudinal trunnion for rocking in a substantially vertical transverse plane and simultaneous sliding in a direction axially of said corresponding longitudinal trunnion, transverse trunnions projecting from the sides of the frame centrally of its ends, a longitudinal rocking beam extending along each side of the frame, each beam being mounted at its mid-point on the corresponding transverse trunnion for rocking in a substantially vertical longitudinal plane and simultaneous sliding in a direction axially of said corresponding transverse trunnion, and individual ball and socket units connected between the ends of the rocking beams and the related axles. With the above structural arrangement of the suspension system, the front and rear wheel-supporting axles are each permitted of oscillating or rocking action upon upward or downward motion of either of the related wheels; such action producing a response, in the remainder of the suspension system, such that it attains the aforementioned compensating action.

The present invention provides, as a still further object, a practical, reliable, and durable suspension system and one which is exceedingly effective for the purpose for which it is designed.

BRIEF DESCRIPTION OF THE DRAWINGS

FIG. 1 is a diagrammatic plan view of a four-wheel drive vehicle embodying the improved suspension system.

FIG. 6 is an enlarged fragmentary plan view of the longitudinal trunnion and sleeve assembly for one of the transverse axles; the view illustrating, in full and broken lines, different positions which the axle and sleeve slidably occupy relative to said trunnion.

FIG. 7 is an enlarged fragmentary plan view of the transverse trunnion and sleeve assembly for one of the longitudinal rocking beams; the view illustrating, in full and broken lines, different positions which the rocking beam and sleeve slidably occupy relative to said trunnion.

DESCRIPTION OF THE PREFERRED EMBODIMENT

Figure 2:
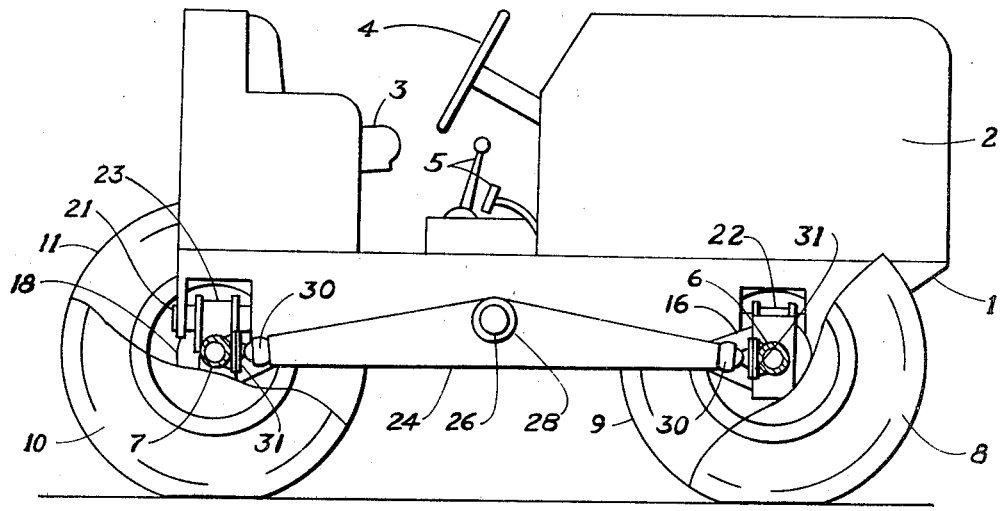
FIG. 2 is a side elevation of such vehicle; the view, which is partly broken away, showing the position of the vehicle with the wheels resting on a level surface.
Figure 3:
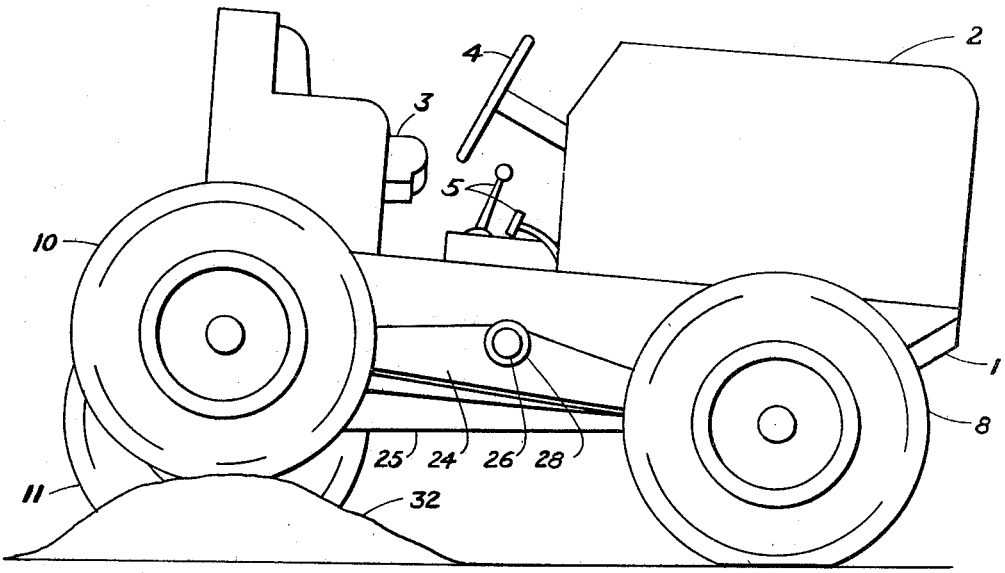
FIG. 3 is a similar view but shows the position of the vehicle with one wheel raised upon traversing a hump.
Figure 4:
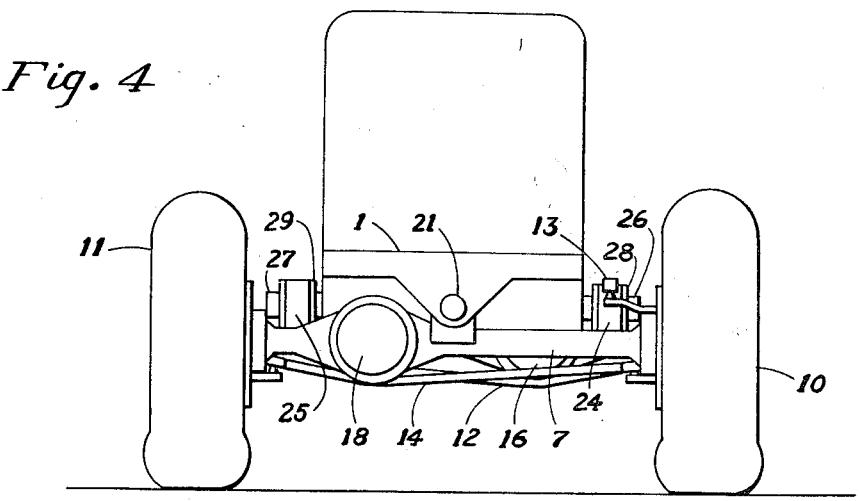
FIG. 4 is a rear end elevation of the vehicle positioned as in FIG. 2.
Figure 5:
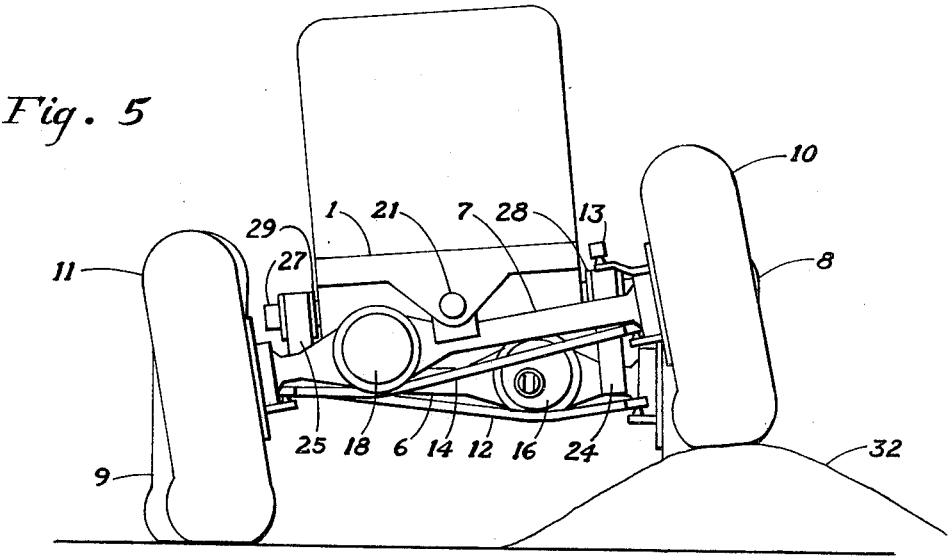
FIG. 5 is a rear end elevation of the vehicle positioned as in FIG. 3.

Referring now more particularly to the drawings and to the characters of reference marked thereon, the improved suspension system is here shown, diagrammatically, as embodied in a four-wheel drive, four-wheel steer vehicle which includes a rigid substantially rectangular frame 1. In conventional fashion, the frame 1 supports an engine 2, an operator's seat 3, a steering wheel 4, and controls 5.

In clearance relation to the frame 1 are a transverse front axle 6 and a transverse rear axle 7; the front axle 6 being fitted at its ends with pneumatic-tire wheels, the right front wheel being indicated at 8, and the left front wheel at 9. Similarly, the rear transverse axle 7 is fitted at its ends with pneumatic-tire wheels; the right rear wheel being indicated at 10, and the left rear wheel at 11.

In conventional manner, the front wheels 8 and 9 and the rear wheels 10 and 11 are all steerably mounted in connection with the related axles; the front wheels being connected by a tie rod 12 and provided with a steering knuckle 13, while the rear wheels are connected by a tie rod 14 and also provided with a steering knuckle 15.

Further, and also in conventional manner, the front axle 6 is provided with an offset differential 16 actuated by a universal drive shaft 17, while the rear axle 7 is provided with an offset differential 18 actuated by a universal drive shaft 19.

Adjacent its front end and centrally of its sides, the frame 1 has mounted in connection therewith a fixed, longitudinally extending trunnion 20, while a similar fixed, longitudinally extending trunnion 21 is mounted adjacent the rear end of said frame centrally of its sides; the front trunnion 20 and rear trunnion 21 being axially alined.

The front axle 6, mid-point of its length, includes a sleeve 22 which embraces the front trunnion 20 in rotatable and axially slidable relation; while the rear axle 7, mid-point in its length, includes a sleeve 23 which embraces the rear trunnion 21 in rotatable and axially slidable relation.

A longitudinal rocking beam extends along each side of the frame 1; the right-hand rocking beam being indicated at 24, while the left-hand rocking beam is indicated at 25; such rocking beams being heavy-duty and of substantial length.

One each side thereof, centrally of its ends, the frame 1 is fited with a transverse trunnion; the right-hand trunnion being indicated at 26, while the left-hand trunnion is indicated at 27; such trunnions being axially alined. The right-hand rocking beam 24 is provided, mid-point of its length, with a sleeve 28 which embraces the related transverse trunnion 26 in rotatable and axially slidable relation. Similarly, the left-hand rocking beam 25 is provided, mid point of its length, with a sleeve 29 which embraces the related transverse trunnion 27 in rotatable and axially slidable relation.

The ends of the rocking beams 24 and 25 are connected to adjacent points on the related transverse axles 6 or 7 by means of ball and socket units 30; one part of each of which is attached to said related axle by a mount indicated at 31.

In the described suspension system it will be recognized that the rocking beams 24 and 25 remain at all times in parallel longitudinal planes, and that the rockable front axle 6 and rear axle 7 are in parallel transverse planes; the related trunnions 26–27 and 20–21 all being disposed in a common horizontal plane when the vehicle is resting on a level surface.

The above described suspension system provides a very effective compensating action under all working conditions; such compensating action lessening the lateral tilt imparted to the vehicle as it traverses uneven terrain, while at the same time all of the wheels remain in positive driving engagement with the ground.

One example of such compensating action will now be described.

Upon the right rear wheel 10 riding over a hump 32, such wheel is raised relative to the frame 1; the resultant pivotal action of the right rocking beam 24 relatively lowering the right front wheel 8 which, in turn and through the medium of the resultant rocking motion of the front axle 6, relatively raises the left front wheel. Also, upon the right rear wheel 10 being raised by engagement with the hump 32, the attendant rocking action of the rear axle 7 relatively lowers the left rear wheel 11; such motion, in turn, producing a pivotal action of the left-hand rocking beam 25 which tends to raise the left front wheel 9 to the same extent and simultaneously with the raising motion imparted to said wheel by the aforementioned rocking motion of the front axle 6.

It will thus be recognized that, upon any wheel raising as the vehicle traverses uneven ground, there will be a relative raising motion imparted to the diagonally opposite wheel, while the two remaining diagonally opposite wheels will have relatively lowering motion imparted thereto; all of which produces the desired compensating action of the described suspension system.

It will be understood that upon any wheel of the vehicle raising (or lowering) as such vehicle traverses uneven terrain, the above described compensating action will be accompanied by axial sliding motion of the sleeves 22, 23, 28, and 29 on the related trunnions and simultaneously with rotation of said sleeves on such trunnions. This assures against any binding being imposed on the axles and rocking beams as they rock or oscillate in their respective planes. Also, the ball and socket units 30 permit adjacent portions of the axles and rocking beams to be variably angled relative to each other during functioning of the suspension system.

The longitudinal rocking beams 24–25, in addition to their function in the compensating action of the suspension system, serve the purpose of radius rods whereby all thrust or pull is applied to the transverse trunnions 26–27.

While the improved suspension system is here shown and described in an unsprung vehicle, the concept of such suspension system can—with equal facility—be provided in a vehicle having spring means and which would be interposed between mounts for the trunnions 20–21, and related portions of the frame 1.

From the foregoing description, it will be readily seen that there has been produced such a suspension system for vehicles as substantially fulfills the objects of the invention, as set forth herein.

While this specification sets forth in details the present and preferred construction of the suspension system for vehicles, still in practice such deviations from such detail may be resorted to as do not form a departure from the spirit of the invention.

What is claimed is:

1. A suspension system, for a four-wheel vehicle having a frame and transversely extending front and rear wheel supporting axles, comprising longitudinal trunnions mounted in connection with the frame adjacent the ends and centrally of its sides, means mounting each axle at its mid-point on the corresponding longitudinal trunnion for rocking in a substantially vertical transverse plane and simultaneous sliding in a direction axially of said corresponding longitudinal trunnion, transverse trunnions projecting from the sides of the frame centrally of its ends, a longitudinal rocking beam extending along each side of the frame, means mounting each beam at its mid-point on the corresponding transverse trunnion for rocking in a substantially vertical longitudinal plane and simultaneous sliding in a direction axially of said corresponding transverse trunnion, and universal connections between the ends of the rocking beams and the related axles.

2. A suspension system, as in claim 1, in which said universal connections are ball and socket units.

3. A suspension system, as in claim 1, in which the axles are in parallel transverse planes, and the rocking beams are in parallel longitudinal planes; the rocking beams extending at right angles to said axles.

4. A suspension system, as in claim 1, in which the axle mounting means comprises a sleeve on each axle, and the beam mounting means comprises a sleeve on each beam; the respective sleeves being rotatable and axially slidable on the related trunnions.

5. A suspension system, as in claim 1, in which the trunnions are all disposed in a common horizontal plane when the vehicle is on a level surface; the longitudinal trunnions being axially alined, and the transverse trunnions being axially alined.

References Cited

UNITED STATES PATENTS

| | | | |
|---|---|---|---|
| 3,266,815 | 8/1966 | Bishop | 280—104 |
| 3,001,798 | 9/1961 | Logan | 280—104 |

PHILIP GOODMAN, Primary Examiner

U.S. Cl. X.R.

180—45; 280—91